(No Model.)
D. M. SUTTON.
DEVICE FOR TRIMMING AND PARING HOOFS.
No. 524,408. Patented Aug. 14, 1894.
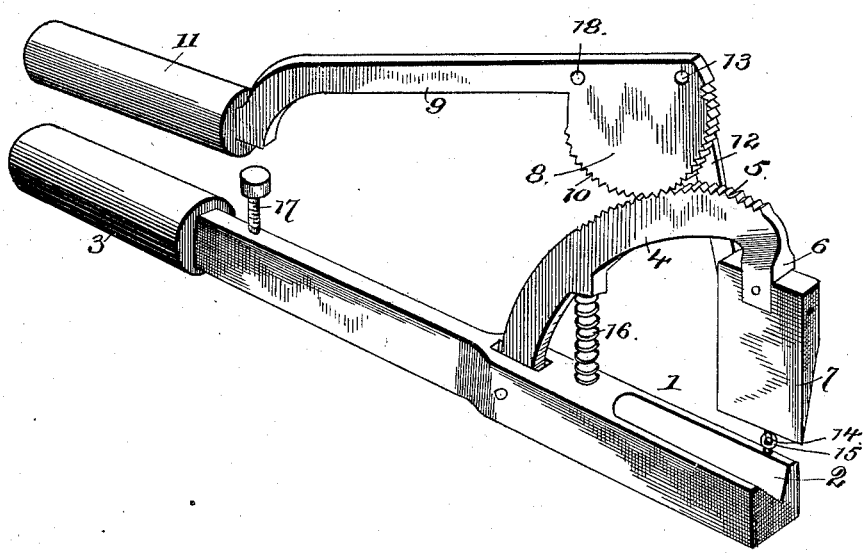
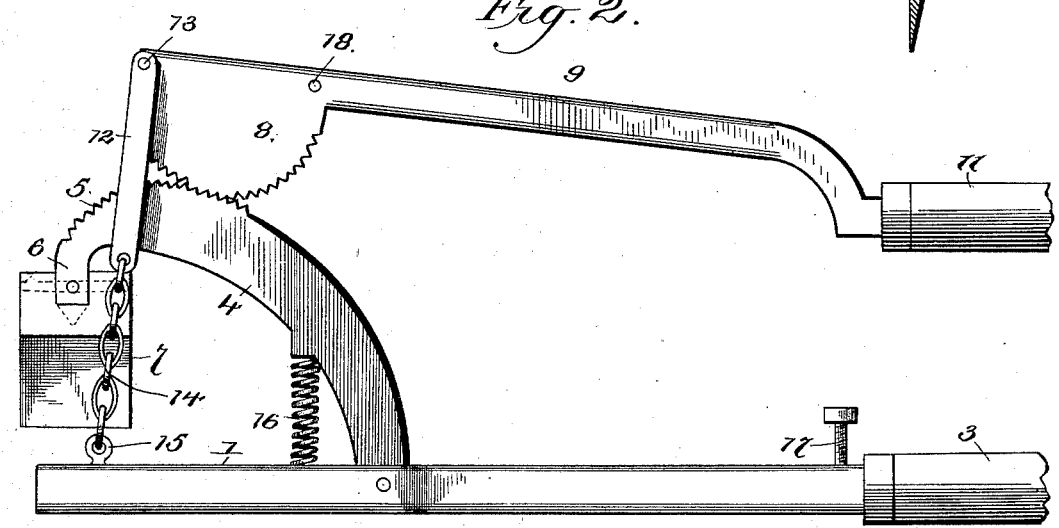

UNITED STATES PATENT OFFICE.

DELANA M. SUTTON, OF HARRISON, NEBRASKA.

DEVICE FOR TRIMMING AND PARING HOOFS.

SPECIFICATION forming part of Letters Patent No. 524,408, dated August 14, 1894.

Application filed January 26, 1894. Serial No. 498,119. (No model.)

*To all whom it may concern:*

Be it known that I, DELANA M. SUTTON, a citizen of the United States, and a resident of Harrison, in the county of Sioux and State of Nebraska, have invented certain new and useful Improvements in Devices for Trimming and Paring Hoofs; and I do hereby declare the following to be a full, clear, and exact description of the invention, such as will enable others skilled in the art to which it appertains to make and use the same.

This invention relates to devices for trimming and paring hoofs, and has for its object to provide a device of the character set forth which is positive in its action, readily applied and operated and comparatively inexpensive in its manufacture.

With these and other objects in view the invention consists of the construction and arrangement of the several parts which will be more fully hereinafter described and claimed.

In the drawings:—Figure 1 is a perspective view of the improved device. Fig. 2 is a side view looking from the opposite side. Fig. 3 is a transverse central section of the cutter block.

Similar numerals of reference are employed to indicate corresponding parts in the several figures.

Referring to the drawings, the numeral 1 designates a base rest having a groove 2 in the upper side thereof at one end of the same and at the opposite end it is provided with a handle 3, by means of which the said base rest is held against the hoof of the animal. Pivoted to the said base rest adjacent to the handle 3, is a curved arm 4, having teeth or serrations on a portion of the upper edge thereof, as at 5, and at its end is formed a vertical extension 6, adapted to engage and hold a cutter block 7, which is reversible.

An eccentric head 8, which is integrally formed or attached to a lever 9, engages the upper edge of the arm 4, it being provided with teeth or serrations 10, to engage the teeth or serrations 5 on the said arm 4. The free end of the said lever is provided with a handle 11 and at its opposite end is attached a link 12, by means of a pivot 13, and to the lower end of said link is adjustably attached a chain 14, which is adapted to engage a hook or eye 15 on the said base rest 1. By this means the said lever 9 has its throw made adjustable and at the same time the cutter block 7 may be brought nearer to or elevated farther away from the base rest 1 in its normal position. The hoof of the animal is brought to bear on the base rest and the cutter block operated to trim the hoof as desired around the sides of the same. When the bottom of the hoof is pared it is placed in the groove 2 so as to be conveniently held for this purpose.

To sustain the arm 4 in proper position and cause a return of the said arm after being depressed, a repellent spring 16 is connected to the said arm and the said base rest as clearly shown. Also a gage screw 17 is employed to regulate the movement of the handle.

The eccentric 8 opposite the pivot 13 is also provided with an opening 18 in order to receive the said pivot and thereby permit the knife block to be worked by raising the lever 9 in the same manner as by pressing said lever downward.

Having thus described the invention, what is claimed as new is—

1. In a device for trimming and paring hoofs, the combination with a base rest having a handle at one end, of an arm pivoted thereto, a reversible cutter block carried by said arm, a lever with an eccentric head engaging said arm, and a link and chain adjustably connected to said head, substantially as described.

2. In a device for trimming and paring hoofs, the combination of a base rest, an arm pivotally connected to said base rest, and having teeth or serrations on a portion of the upper edge thereof, a reversible cutter block carried by said arm over the said base rest, a lever having an eccentric head with teeth or serrations to engage the aforesaid teeth or serrations, a spring in connection with said arm and said base rest, and a link and chain attached to said eccentric head and to said base rest, substantially as described.

In testimony whereof I have signed this specification in the presence of two subscribing witnesses.

DELANA M. SUTTON.

Witnesses:
JOHN DANT,
S. LINVILLE ELLIS.